(12) United States Patent
Murakami et al.

(10) Patent No.: US 9,146,310 B2
(45) Date of Patent: Sep. 29, 2015

(54) OBJECT DETECTION DEVICE AND ILLUMINATION SYSTEM PROVIDED THEREWITH

(75) Inventors: Tadashi Murakami, Osaka (JP); Tamami Ono, Kyoto (JP); Shigeo Gotou, Osaka (JP)

(73) Assignee: PANASONIC INTELLECTUAL PROPERTY MANAGEMENT CO., LTD., Osaka-shi (JP)

( * ) Notice: Subject to any disclaimer, the term of this patent is extended or adjusted under 35 U.S.C. 154(b) by 796 days.

(21) Appl. No.: 13/392,219

(22) PCT Filed: Aug. 9, 2010

(86) PCT No.: PCT/JP2010/063491
§ 371 (c)(1),
(2), (4) Date: Mar. 29, 2012

(87) PCT Pub. No.: WO2011/024634
PCT Pub. Date: Mar. 3, 2011

(65) Prior Publication Data
US 2013/0009555 A1    Jan. 10, 2013

(30) Foreign Application Priority Data

Aug. 26, 2009    (JP) .................................. 2009-196108

(51) Int. Cl.
| G01S 13/56 | (2006.01) |
| G01S 7/02 | (2006.01) |
| G01S 7/292 | (2006.01) |
| G01S 15/52 | (2006.01) |
| G01S 17/50 | (2006.01) |
| H05B 37/02 | (2006.01) |

(52) U.S. Cl.
CPC ................. *G01S 13/56* (2013.01); *G01S 7/023* (2013.01); *G01S 7/2922* (2013.01); *G01S 15/523* (2013.01); *G01S 17/50* (2013.01); *H05B 37/0227* (2013.01); *Y02B 20/44* (2013.01)

(58) Field of Classification Search
CPC ............... H05B 37/02; H05B 37/0227; H05B 37/0272; G01S 13/04; G01S 13/06; G01S 13/56; G01S 13/583; G01S 13/585; G01S 13/86; G01S 13/886
USPC ......................................................... 315/159
See application file for complete search history.

(56) References Cited

U.S. PATENT DOCUMENTS 7,333,048 B2 * 2/2008 Nakagawa et al. ............. 342/28
2006/0164289 A1 7/2006 Nakagawa et al.

FOREIGN PATENT DOCUMENTS

| EP | 1683693 A1 | 7/2006 |
| JP | 2001-166052 A | 6/2001 |

(Continued)

OTHER PUBLICATIONS

Supplementary European Search Report dated Dec. 19, 2012, issued for the counterpart European patent application No. 10811684.9.

(Continued)

*Primary Examiner* — John Poos
*Assistant Examiner* — David Mattison
(74) *Attorney, Agent, or Firm* — Locke Lord LLP

(57) ABSTRACT

An object detection device comprises an active sensor, an amplifying circuit configured to divide and amplify a sensor signal outputted from said active sensor with respect to each a plurality of frequency bands through each amplifier, and a determining unit determining the presence or absence of a detection target object by comparing an output of said amplifying circuit with a predetermined threshold value. A noise determining unit controls a switching circuit so as to turn off a switch inserted between said determining unit and an amplifier having a band pass including a noise of a particular frequency, when determining that the noise of the particular frequency is produced constantly by using an analysis result outputted from a frequency analyzer detecting intensity of each frequency of the sensor signal.

10 Claims, 3 Drawing Sheets

(56) References Cited

FOREIGN PATENT DOCUMENTS

| JP | 2008-111773 A | 5/2008 |
| JP | 2008-185471 A | 8/2008 |
| JP | 2009-129775 A | 6/2009 |
| JP | 2009-168778 A | 7/2009 |

OTHER PUBLICATIONS

International Search Report dated Oct. 12, 2010, issued for PCT/JP2010/063491.

* cited by examiner

OBJECT DETECTION DEVICE AND ILLUMINATION SYSTEM PROVIDED THEREWITH

TECHNICAL FIELD

The invention relates generally to object detection devices and illumination systems provided therewith and, more particularly, to an object detection device comprising a sensor, which detects the presence or absence of a detection target object in a detection area and outputs a sensor signal, and an illumination system provided therewith.

BACKGROUND ART

In the past, there have been proposed an illumination system, which comprises a lighting apparatus and an object detection device comprising a sensor (a motion sensor). Then, the illumination system detects the presence or absence of a detection target object (e.g., a person) in a predetermined detection area via the object detection device, and activates the lighting apparatus during a predetermined time period upon detecting the presence. Thus, the illumination system can activate or deactivate the lighting apparatus automatically, and can prevent a user from forgetting to turn the lighting apparatus off and then can improve convenience and energy conservation. Especially, the illumination system is generally used in locations, such as stairs and passages of establishments, where it is necessary to activate the lighting apparatus to ensure security of a passerby, and where there is no problem if the lighting apparatus is activated only when there is the passerby.

Incidentally, in this kind of the illumination system, in the past, a PIR (Passive Infrared Ray) sensor mainly has been used for the object detection device. The PIR sensor is a passive type sensor, and senses temperature variations caused by a person's motion in a detection area, and outputs a sensor signal. This sensor is relatively cheap and can be used easily.

However, when the above illumination system with the sensor is installed in a location, such as a high ceiling in a factory, a distance from the sensor to the detection target object increases. Therefore, it is difficult to use the PIR sensor having a relatively short sensing distance. So, an active sensor having a relatively long sensing distance is used in such a location. The active sensor itself transmits a detection wave such as an electromagnetic wave, and then receives the detection wave reflected by the detection target object, and thereby detects the presence or absence of the detection target object in the detection area For example, the active sensor includes a millimeter-wave sensor which transmits a millimeter wave as the detection wave and a distance measuring sensor. The millimeter-wave sensor comprises a Doppler sensor. The Doppler sensor transmits the millimeter wave to the detection area, and then receives the millimeter wave reflected by the detection target object moving in the detection area, and then outputs a sensor signal having a frequency, which is equivalent to a frequency difference between the transmitted millimeter wave and the received millimeter wave. The object detection device comprising the sensor determines the presence or absence of object moving in the detection area, based on the sensor signal outputted from the sensor, and controls to a lighting state of the lighting apparatus (e.g., see Japanese Patent Application Laid-Open No. 2009-168778).

However, if there is a noise source producing a noise of a particular frequency around the object detection device with the active sensor, the noise decreases a signal-to-noise ratio of the object detection device. Therefore, there is a problem that the sensor signal is buried in the noise and the object detection device can not detect the sensor signal, and thus sensitivity of detection decreases.

DISCLOSURE OF THE INVENTION

It is an object of the present invention to provide an object detection device, which can decrease the influence of a noise of a particular frequency produced constantly and can improve sensitivity of detection, and an illumination system provided therewith.

An object detection device of the present invention comprises an active sensor, a signal processor, a determining unit, a frequency analyzer and a noise rejection unit. Then, said active sensor transmits a detection wave to a predetermined detection area, and receives the detection wave reflected by a detection target object, and thereby detects the presence or absence of the detection target object in the predetermined detection area, and outputs a sensor signal. Then, said signal processor outputs the sensor signal with respect to each predetermined frequency band, and then said determining unit determines the presence or absence of the detection target object by comparing an output of said signal processor with a predetermined threshold value. Then, said frequency analyzer detects intensity of each frequency of the sensor signal. Then, said noise rejection unit causes said determining unit to invalidate a frequency band including a noise of a particular frequency having intensity greater than or equal to a defined value, when the noise of the particular frequency is detected constantly from an output of said frequency analyzer. In this configuration, said noise rejection unit causes said determining unit to invalidate a frequency band including a noise of a particular frequency having intensity greater than or equal to a defined value, when the noise of the particular frequency is detected constantly from an output of said frequency analyzer. Thus, even if there is a noise source constantly producing a noise of a particular frequency around the object detection device, the object detection device can invalidate the frequency band including the noise, and then can determine the presence or absence of the detection target object. Therefore, the object detection device can decrease the influence of a noise of a particular frequency produced constantly and can improve sensitivity of detection.

In one embodiment, said signal processor comprises an amplifying circuit having a plurality of amplifiers, and then said plurality of amplifiers divide and amplify the sensor signal with respect to each of a plurality of frequency bands to output to said determining unit. In this configuration, said plurality of amplifiers divide and amplify the sensor signal with respect to each of a plurality of frequency bands to output to said determining unit, and thus said determining unit can determine the presence or absence of the detection target object from the plurality of frequency bands of the sensor signal received at the same timing.

In one embodiment, said active sensor is a Doppler sensor using a radio wave as the detection wave, and then said Doppler sensor is configured to output the sensor signal having a frequency which is equivalent to a frequency difference between the detection wave transmitted to the detection area and the detection wave reflected by the detection target object moving in the detection area. In this configuration, said active sensor is a Doppler sensor, and thus the object detection device can detect the presence or absence of the detection target object moving in the detection area, and a stationary target object in a fixed position can be excluded from a detection target.

In one embodiment, the sensor signal outputted from said active sensor includes a frequency at least depending on a size of the detection target object and having a width greater than or equal to a predetermined width, when said active sensor detects the presence of the detection target object. Then, a band width of a frequency band outputted from said signal processor is defined to be narrower than the predetermined width. In this configuration, even when a noise source produces a noise of a particular frequency which superimposes to a signal component of the sensor signal outputted from said active sensor according to detection of the presence of the detection target object and said noise rejection unit invalidates a frequency band including the noise, all signal components of the sensor signal are not invalidated by said noise rejection unit. Therefore, said determining unit can determine the presence or absence of the detection target object.

In one embodiment, said determining unit is configured to define the predetermined threshold value with respect to each of frequency bands outputted from said signal processor. Further, said determining unit is configured to redefine the predetermined threshold value according to the surrounding environment in stable state, where a variation width of intensity of the sensor signal detected by said frequency analyzer is within a defined range during a predetermined time period. In this configuration, when a variation width of an intensity of the sensor signal remains stable state during a predetermined time period, said determining unit redefines the predetermined threshold value according to the surrounding environment. Thus, the object detection device can detect the presence or absence of the detection target object with most suitable sensitivity according to the surrounding environment.

According to a second aspect of the present invention, an illumination system comprises the above-mentioned object detection device and a lighting apparatus connected to the object detection device. The object detection device comprises a lighting controller, and said lighting controller controls a lighting state of said lighting apparatus to activate said lighting apparatus, when detecting the presence of the detection target object. In this configuration, the illumination system can decrease the influence of a noise of a particular frequency produced constantly and can improve sensitivity of detection. Thus, even if the sensor signal is buried in the noise, the illumination system can detect the presence of the detection target object and can activate said lighting apparatus.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

In the following embodiments, an illumination system using an object detection device of the present invention is described.

(Embodiment 1)

Figure 2:
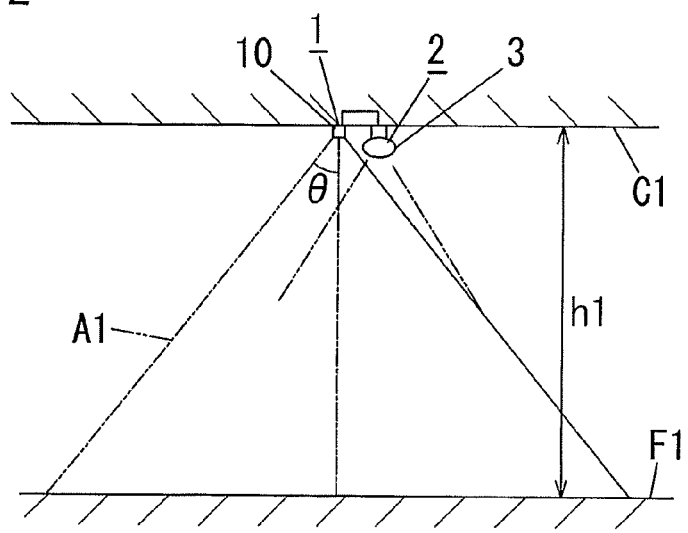
FIG. 2 is a schematic view showing an installation situation according to said Embodiment 1 of the present invention.

As shown in FIG. 2, an illumination system of the present embodiment comprises an object detection device 1 provided with a sensor 10 detecting the presence or absence of a detection target object in a detection area A1 and outputting a sensor signal, and a lighting apparatus 2 connected to the object detection device 1. The object detection device 1 controls a lighting state of the lighting apparatus 2. The object detection device 1 and the lighting apparatus 2 are installed adjacent to each other to a ceiling C1 located above the detection area A1. Here, the object detection device 1 and the lighting apparatus 2 are installed to the ceiling C1 with a height of "h1"=10 [m] in a warehouse, and then the sensor 10 of the object detection device 1 has a view angle "0" of about 30 degrees downward in a vertical direction. Then, under the sensor 10, the detection area A1 is formed into a conically-shape of which a top is located in the sensor 10.

The sensor 10 of the object detection device 1 is active sensor 10. Then, the active sensor 10 itself transmits a detection wave, such as an electromagnetic wave, to the detection area A1, and receives the detection wave reflected by the detection target object, and thereby detects the presence or absence of the detection target object in the detection area A1. In the present embodiment, a millimeter-wave sensor (a Doppler sensor) is used as the active sensor 10, and transmits a millimeter wave of 24.15 [GHz] to the detection area A1, and receives the millimeter wave reflected by the detection target object moving in the detection area A1, and outputs a sensor signal having a Doppler frequency which is equivalent to a frequency difference between the transmitted millimeter wave and the received millimeter wave. As well known, when the object reflecting the electromagnetic wave (the millimeter wave) is moving, a frequency of the reflected wave shifts by Doppler Effect. Thus, the sensor 10 detects the presence or absence of the object moving in the detection area A1 by using the shift of the frequency.

Figure 1:
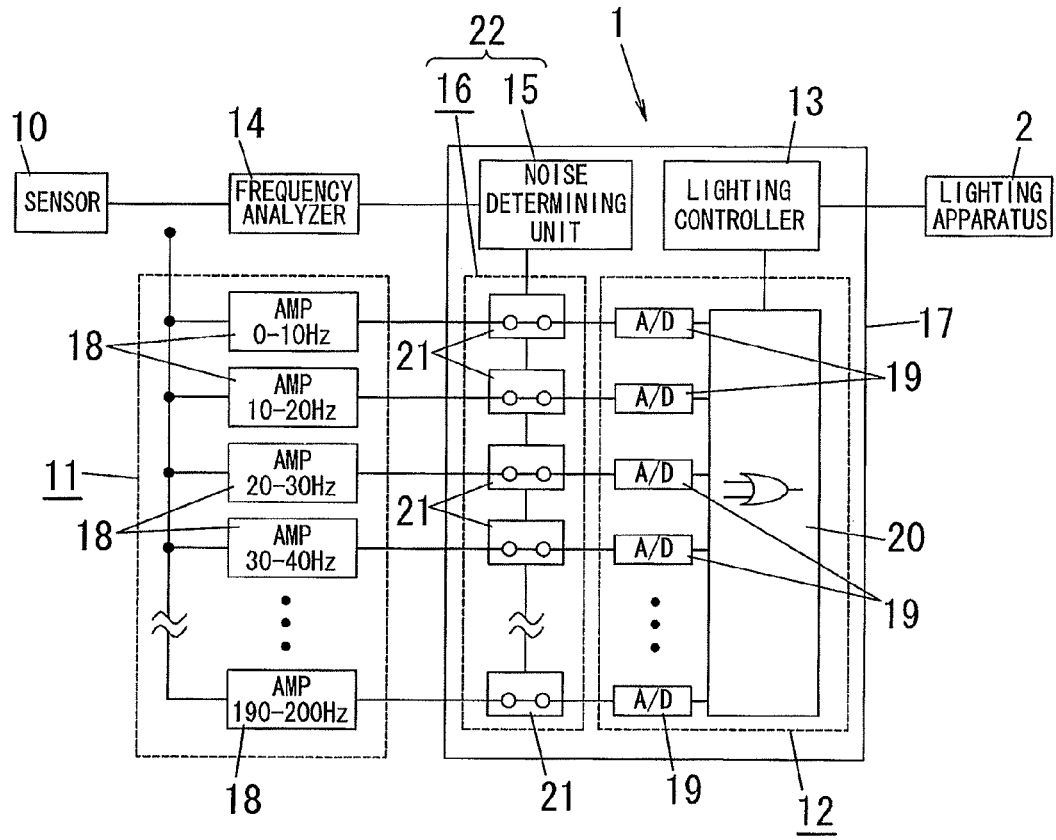
FIG. 1 is a block diagram showing a configuration according to Embodiment 1 of the present invention.

As shown in FIG. 1, the object detection device 1 comprises an amplifying circuit 11, a determining unit 12 and a lighting controller 13 in addition to the above-mentioned sensor 10. Then, the amplifying circuit 11 is configured to divide the sensor signal outputted from the sensor 10 with respect to each of a plurality of frequency bands and to amplify the sensor signal with respect to each of the plurality of frequency bands, and the determining unit 12 determines the presence or absence of the detection target object by comparing an output of the amplifying circuit 11 with a predetermined threshold value, and the lighting controller 13 controls a lighting state of a light source 3 of the lighting apparatus 2 according to a determination result in the determining unit 12.

Furthermore, the object detection device 1 of the present embodiment comprises a frequency analyzer 14 and a noise rejection unit 22 (a noise determining unit 15 and a switching circuit 16). Then, the frequency analyzer 14 detects intensity of each frequency of the sensor signal outputted from the sensor 10, and the noise rejection unit 22 decreases the influence of a noise of a particular frequency produced constantly by using an analysis result in the frequency analyzer 14. Here, a FFT (fast Fourier transform) analyzer is used as the frequency analyzer 14, and analyzes every 0.2 [sec]. Then, the determining unit 12, the lighting controller 13 and the noise rejection unit 22 are included in a control block 17 mainly comprising a microcomputer. The amplifying circuit 11 constitutes a signal processor outputting the sensor signal with respect to each of predetermined frequency bands. However, not only the amplifying circuit 11 but also a FFT analyzer and a digital filter may constitute the signal processor.

The amplifying circuit 11 has a plurality of amplifiers 18, and an operational amplifier is used as each amplifier 18. Then, in each amplifier 18, a frequency band of a signal, being subject for amplifying, can be set by an adjustment of various parameters of a circuit constituting the amplifier 18. That is, each amplifier 18 also functions as a bandpass filter permitting the passage of a signal of a particular frequency. Then, in the amplifying circuit 11, the plurality of amplifiers 18 are connected in parallel, and then divide and amplify the sensor signal with respect to each of a plurality of frequency bands. Then, each amplifier 18 outputs a divided and amplified signal having the corresponding frequency band, individually. In this way, the amplifying circuit 11 amplifies the small sensor signal, and thus the subsequent determining unit 12 can handle determination of the sensor signal easily.

Figure 3:
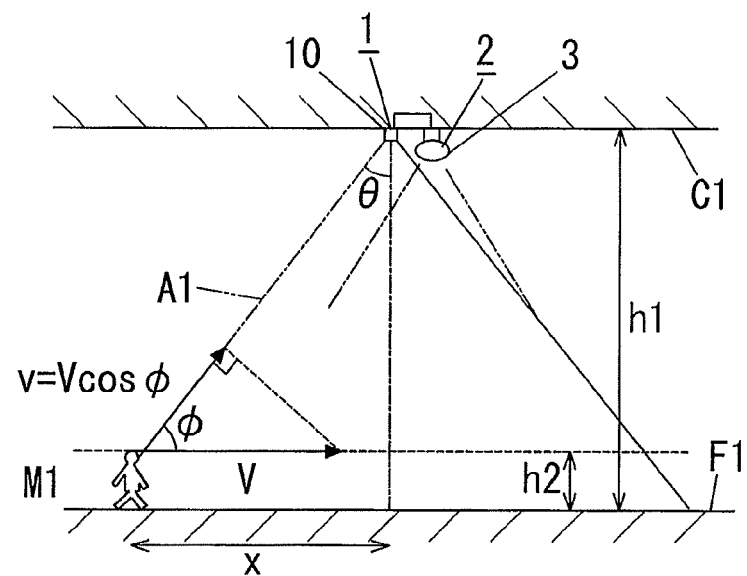
FIG. 3 is a schematic view showing a sensed situation of the detection target object according to said Embodiment 1 of the present invention.

Here, as shown in FIG. 3, when the detection target object M1 is a person moving at a speed of less than or equal to 2 [m/s], the determining unit 12 requires to receive the sensor signal having a frequency band of about 0 to 160 [Hz] in order to detect the detection target object M1. That is, when "$f_0$" denotes a frequency of the millimeter wave transmitted from the sensor 10 and "c" denotes the light speed and "V" denotes the moving speed of the detection target object M1 on a floor face F1 and "$\phi$" denotes an angle between a moving direction of the detection target object M1 and a straight line connecting the sensor 10 and a top end of the detection target object M1, a velocity component "v" of the detection target object M1 in a direction toward the sensor 10 is represented by "v=V cos $\phi$", and then a frequency "$f_d$" of the sensor signal (a Doppler frequency) is represented by the following [Equation 1].

$$f_d = \frac{2f_0}{c} \cdot v = \frac{2f_0}{c} \cdot V \cos\phi \quad \text{[Equation 1]}$$

Here, when "h2" denotes height of the detection target object M1 (body height) and "x" denotes a horizontal distance from the sensor 10 to the detection target object M1, the above "cos $\phi$" is represented by the following [Equation 2].

$$\cos\phi = \frac{x}{\sqrt{x^2 + (h1 - h2)^2}} \quad \text{[Equation 2]}$$

Here, "$\phi$" is represented by $\phi=90°-\theta$ ("$\theta$" denotes the view angle of the sensor). Therefore, when "$\theta$" of the view angle is 30 degrees, "$\phi$" is 60 degrees. Then, when $\phi=60°$, h1=10 [m] and h2=1.5 [m] are substituted into the above [Equation 2], "x" becomes about 5 [m]. That is, when the person having height of 1.5 [m] enters into the circular-shaped detection area A1 with radius 5 [m] of which the center is on the floor face F1 under the sensor 10, the sensor 10 can detect the presence of the person. Then, when the above [Equation 2] is substituted into the above [Equation 1], the following [Equation 3] is obtained.

$$f_d = \frac{2f_0}{c} \cdot V \cdot \frac{x}{\sqrt{x^2 + (h1 - h2)^2}} \quad \text{[Equation 3]}$$

If $f_0$=24.15 [GHz], c=3*10$^8$ [m/s], h1=10 [m] and h2=1.5 [m] are substituted into the above [Equation 3], the frequency "$f_d$" of the sensor signal reaches a minimum at zero when x=0, and then increases with an increase in "x". Then, the frequency "$f_d$" of the sensor signal increases with an increase in the moving speed "V" of the detection target object M1. Thus, under the above condition (the detection area A1 on the floor face F1 has radius 5 [m] and the moving speed "V" of the detection target object M1 is less than or equal to 2 [m/s]), the frequency "$f_d$" of the sensor signal reaches its peak at about 163 [Hz] when x=5 and V=2. Therefore, just to be on the safe side, an object of signal amplification in the amplifying circuit 11 is set into a frequency band of 0 to 200 [Hz].

Then, human body has a certain amount of size (height), and each part (such as arm and leg) of the human body is intricately operated with moving. Thus, even if the detection target object M1 moves at a constant speed in the detection area A1, a frequency of the sensor signal outputted at a particular time has not single component but a certain amount of width.

That is, even under the above same condition (when "$f_d$" reaches about 163 [Hz]), when focused on a millimeter wave reflected beneath feet of the human body, the above-mentioned h2 becomes 0 [m]. Thus, the frequency "$f_d$" of the sensor signal reaches about 144 [Hz] when x=5 and V=2. Furthermore, since each part (such as arm and leg) of the human body is intricately operated, the sensor signal outputted upon detection of the detection target object M1 generally has a bandwidth in the order of 40 to 50 [Hz].

So, the amplifying circuit 11 of the present embodiment is configured to divide a frequency band of 0 to 200 [Hz] into a plurality of frequency bands, and thereby each of the plurality of frequency bands is narrower than the bandwidth (40 to 50 [Hz]) of the sensor signal outputted upon detection of the detection target object M1. Specifically, the amplifying circuit 11 sets a plurality of frequency bands (hereinafter, called "band pass"), being subject to signal amplification in the plurality of amplifiers 18, into 0 to 10 [Hz], 10 to 20 [Hz], 20 to 30 [Hz], . . . , 190 to 200 [Hz], respectively, so as to divide a frequency band of 0 to 200 [Hz] at 10 [Hz] intervals, and thus the plurality of frequency bands do not overlap with each other.

The determining unit 12 comprises a comparator 19 with respect to each amplifier 18. Then, each comparator 19 converts an output of the corresponding amplifier 18 into a digital value as A/D conversion, and then compares the digital value with a predetermined threshold value, and thereby the determining unit 12 determines the presence or absence of the detection target object M1. In addition, the threshold value is set with respect to each band pass (that is, each amplifier 18), individually, and each comparator 19 outputs a high-level signal when the output of the corresponding amplifier 18 is outside the scope of the threshold value. Here, the threshold value "Vth" of each band pass in initial state (before shipment) is set into a value represented by Vth=Vavg±Vppini, and then the "Vppini" means a maximum of peak to peak "Vpp" in outputs "V" of each amplifier 18 detected within a given period of time, in a state where there is no reflection of an electromagnetic wave, such as an anechoic chamber, and the "Vavg" means the average value of said outputs "V". Then, the determining unit 12 comprises an OR circuit 20, which obtains a logical add of a comparison result from each comparator 19. Then, if there is even one high-level signal, the OR circuit 20 outputs a sensing signal showing "sensed condition" which means the presence of the detection target object M1. In contrast, if all signals are low-level, the OR circuit 20 outputs a sensing signal showing "non-sensed condition" which means the absence of the detection target object M1. The sensing signal shows "1" in the sensed condition, and shows "0" in the non-sensed condition.

The lighting controller 13 receives the sensing signal outputted from the determining unit 12, and then generates a control signal to transmit to the lighting apparatus 2. Here, when the sensing signal outputted from the determining unit 12 shows "1" (the sensed condition) and the light source 3 of the lighting apparatus 2 is deactivated, the lighting controller 13 transmits a control signal to the lighting apparatus 2 to activate the light source 3, and thereby the light source 3 is turned on. At the same time, the lighting controller 13 starts a countdown of a predetermined lighting holding time. In contrast, when the sensing signal outputted from the determining unit 12 shows "1" and the light source 3 has already been activated, the lighting controller 13 reset the countdown of the lighting holding time. Then, when finishing the countdown of the lighting holding time, the lighting controller 13 transmits a control signal to the lighting apparatus 2 to deactivate the light source 3, and thereby the light source 3 is turned off. In addition, the lighting controller 13 may be located in a power supply line for providing the power to the lighting apparatus 2. In this case, instead of outputting the control signal, the lighting controller 13 can activate or deactivate the light source 3 by turning the power supply to the lighting apparatus 2 on or off.

The noise rejection unit 22 comprises a noise determining unit 15 which determines the presence or absence of a noise of a particular frequency produced constantly from an output of the frequency analyzer 14, and a switching circuit 16 which switches an output state of each amplifier 18 to the determining unit 12 according to a determination result of the noise determining unit 15.

As shown in FIG. 1, the switching circuit 16 comprises a plurality of switches 21, and each switch 21 is inserted between an amplifier 18 of the amplifying circuit 11 and the corresponding comparator 19 of the determining unit 12. All of the switches 21 are turned on in initial state, and then on/off state of each switch 21 is controlled through an output of the noise determining unit 15, individually, and thereby an output from each amplifier 18 to the determining unit 21 is turned on or off, individually. That is, the switching circuit 16 turns off a switch 21 corresponding to an amplifier 18 having an arbitrary band pass of band passes of 0 to 10 [Hz], 10 to 20 [Hz], 20 to 30 [Hz], . . . , 190 to 200 [Hz] through an output of the noise determining unit 15, and thereby an output of the amplifier 18 can be invalidated.

The noise determining unit 15 reads signal intensity (here, voltage intensity) of each frequency (frequency component) of the sensor signal which is outputted from the frequency analyzer 14, and stores the signal intensity in a memory (not shown), and then determines the presence or absence of a noise of a particular frequency produced constantly by using the stored data.

Specifically, the noise determining unit 15 reads an analysis result which is analyzed every 0.2 [s] in the frequency analyzer 14, every 0.2 [s], and calculates the average value of analysis results, which were read during 1 [s], to store as intensity data. Here, the frequency analyzer 14 analyzes to output the signal intensity of individual frequencies spaced apart from each other in 1 [Hz] units between 1 [Hz] and 200 [Hz]. The noise determining unit 15 stores the intensity data (the unit is [mV]) every 1 [s] with respect to each frequency, as shown in the following [Table 1].

Then, the noise determining unit 15 calculates the maximum and the minimum values of the intensity data stored during the past 10 [s] (that is, time t(n−9) to t(n) in [Table 1]) with respect to each frequency, and then determines whether or not the relationship between the maximum and the minimum values satisfies "the minimum value>=the maximum value*0.8".

That is, the noise determining unit 15 determines whether or not a variation of the intensity data stored during the past 10 [s] is within a definite range (here, within 20 [%] of the maximum value) with respect to each frequency. Then, when determining that the relationship satisfies "the minimum value >=the maximum value*0.8" and the variation of the intensity data is within the definite range, the noise determining unit 15 determines that the surrounding environment is currently in "stable state". The determination of whether or not the surrounding environment is in "stable state" is updated every 1 [s] when new intensity data is stored. In [Table 1], the result of the determination of whether or not the surrounding environment is in "stable state" is represented by "0" or "X" (the result is represented by "0" when determining that the surrounding environment is in "stable state"). That is, in an example of [Table 1], the variation of the intensity data is within the definite range during a period of time t(2) to t(11) and during a period of time t(3) to t(12), and thus the noise determining unit 15 determines that the surrounding environment is in "stable state" at time t(11) and time t(12).

TABLE 1

| | | FREQUENCY | | | | | | | | | | | |
|---|---|---|---|---|---|---|---|---|---|---|---|---|---|
| | | 1 Hz | 2 Hz | 3 Hz | 4 Hz | 5 Hz | 6 Hz | 7 Hz | ... | 197 Hz | 198 Hz | 199 Hz | 200 Hz | DETERMINATION |
| TIME | . | . | . | . | . | . | . | . | | . | . | . | . | . |
| | . | . | . | . | . | . | . | . | | . | . | . | . | . |
| | . | . | . | . | . | . | . | . | | . | . | . | . | . |
| | t(1) | 100 | 110 | 90 | 50 | 80 | 100 | 120 | | 50 | 70 | 90 | 40 | X |
| | t(2) | 100 | 110 | 90 | 50 | 80 | 100 | 110 | | 50 | 50 | 40 | 40 | X |
| | t(3) | 100 | 110 | 90 | 50 | 80 | 100 | 120 | | 50 | 50 | 40 | 40 | X |
| | t(4) | 100 | 110 | 90 | 50 | 80 | 100 | 120 | | 50 | 50 | 40 | 40 | X |
| | t(5) | 100 | 120 | 90 | 50 | 80 | 100 | 110 | | 50 | 50 | 40 | 40 | X |
| | t(6) | 100 | 120 | 90 | 50 | 80 | 100 | 120 | | 50 | 50 | 40 | 40 | X |
| | t(7) | 90 | 110 | 90 | 50 | 80 | 100 | 120 | | 50 | 50 | 40 | 40 | X |
| | t(8) | 100 | 120 | 90 | 50 | 70 | 100 | 120 | | 50 | 50 | 40 | 40 | X |
| | t(9) | 100 | 110 | 90 | 50 | 80 | 100 | 120 | | 50 | 50 | 40 | 40 | X |
| | t(10) | 90 | 110 | 90 | 50 | 80 | 100 | 120 | | 50 | 50 | 40 | 40 | X |
| | t(11) | 100 | 110 | 90 | 50 | 80 | 100 | 120 | | 50 | 50 | 40 | 40 | ○ |

TABLE 1-continued

| | FREQUENCY | | | | | | | | | | | | DETERMINATION |
|---|---|---|---|---|---|---|---|---|---|---|---|---|---|
| | | 1 Hz | 2 Hz | 3 Hz | 4 Hz | 5 Hz | 6 Hz | 7 Hz | ... | 197 Hz | 198 Hz | 199 Hz | 200 Hz | |
| | t(12) | 100 | 110 | 80 | 40 | 80 | 100 | 120 | | 50 | 50 | 40 | 40 | ○ |
| | . | . | . | . | . | . | . | . | | . | . | . | . | |
| | . | . | . | . | . | . | . | . | | . | . | . | . | |
| | . | . | . | . | . | . | . | . | | . | . | . | . | |

When determining the surrounding environment is in "stable state" through the above processing, the noise determining unit 15 compares the intensity data with a predetermined defined value with respect to each frequency, and determines the presence or absence of a noise of a particular frequency produced constantly. That is, it is considered that when intensity data of a frequency is greater than or equal to the defined value in "stable state", a noise of said frequency is produced constantly. Therefore, in this case, the noise determining unit 15 determines that a noise of a particular frequency is present.

Here, the defined value is determined by using output values "V" of amplifiers 18. Specifically, the maximum of peak to peak "Vpp" in output values "V" with respect to all amplifiers 18 is obtained, and twice the voltage intensity of the maximum is set as the defined value compared with the intensity data. That is, when peak to peak "Vpp" in output values "V" of each amplifier 18 ranges from 0.100 [V] to 0.150 [V], the maximum of peak to peak "Vpp" is 0.150 [V] and thus the noise determining unit 15 sets 0.300 [V], being 0.150 [V] times two, as the defined value.

Then, when the noise determining unit 15 determines that a noise of a particular frequency is produced constantly, the noise determining unit 15 controls the switching circuit 16 to turn off a switch 21 inserted between the determining unit 12 and an amplifier 18 having a band pass including the noise. Thus, when the noise of the particular frequency is produced constantly, an output of the amplifying circuit 11 to the determining unit 12, corresponding to a frequency band including the noise, is invalidated. Here, on/off state of each switch 21 is updated whenever the noise determining unit 15 determines that the surrounding environment is in "stable state".

Figure 4:
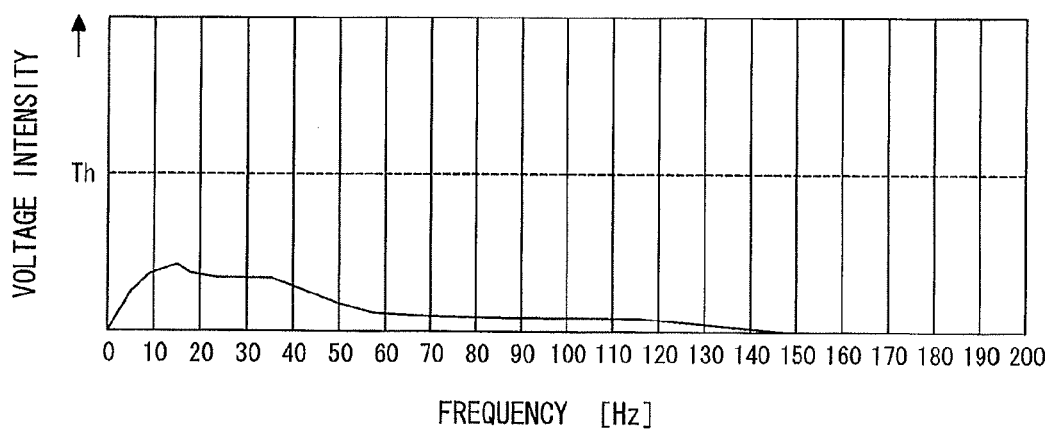
FIG. 4 is a graph showing an output of a frequency analyzer according to said Embodiment 1 of the present invention.
Figure 5:
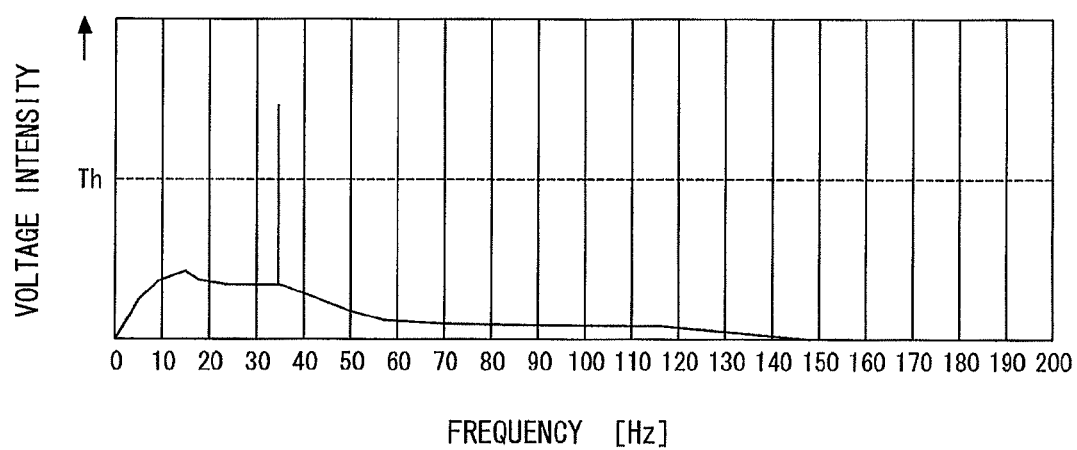
FIG. 5 is a graph showing an output of said frequency analyzer according to said Embodiment 1 of the present invention.

Then, operation of the noise rejection unit 22 is explained referring to FIGS. 4 and 5. In addition, FIGS. 4 and 5 show outputs of the frequency analyzer 14, and a horizontal axis of each figure shows a frequency [Hz] and a vertical axis of each figure shows voltage intensity [mV].

As shown in FIG. 4, when a noise of a particular frequency is absent, there is no frequency having high signal intensity in the output of the frequency analyzer 14. In this case, when the noise determining unit 15 determines that the surrounding environment is in "stable state", there is no intensity data greater than or equal to a defined value "Th". Therefore, all switches 21 in the switching circuit 16 are held in on-state (initial state). Thus, in this case, the determining unit 12 compares a threshold value with an output of each amplifier 18 with respect to band passes of all amplifiers 18, and then the presence or absence of the detection target object M1 is determined.

In contrast, when a noise of a particular frequency (here, for example, 35 [Hz]) is produced constantly, signal intensity of 35 [Hz] constantly increases in the output of the frequency analyzer 14, as shown in FIG. 5. In this case, when the noise determining unit 15 determines that the surrounding environment is in "stable state", intensity data of 35 [Hz] is greater than or equal to a defined value "Th". Therefore, in the switching circuit 16, a switch 21 corresponding to an amplifier 18 having a band pass of 30 to 40 [Hz] is turned off, and an output (30 to 40 [Hz]) of said amplifier 18 to the determining unit 12 is invalidated. Thus, in this case, the determining unit 12 compares a threshold value with outputs of amplifiers 18 only with respect to band passes (that is, 0 to 30 [Hz] and 40 to 200 [Hz]) other than the band pass of 30 to 40 [Hz], and then the presence or absence of the detection target object M1 is determined.

According to the configuration explained above, when a noise of a particular frequency having signal intensity greater than or equal to a defined value "Th" constantly is detected by using an analysis result in the frequency analyzer 14, the noise rejection unit 22 invalidates an output of an amplifier 18 having a frequency band including the noise as a band pass. Thus, when there is a noise source producing a noise of a particular frequency constantly around the object detection device 1, the determining unit 12 can invalidate a frequency band including the noise produced constantly by the noise source and can determine the presence or absence of the detection target object M1. Therefore, the object detection device 1 can detect the presence or absence of the detection target object M1 without receiving the influence of a noise of a particular frequency produced constantly and can improve sensitivity of detection.

Here, even if the sensor 10 detects the presence of the detection target object M1 and then outputs a sensor signal having a frequency band, the object detection device 1 can distinguish a signal component of the sensor signal from a noise produced constantly. That is, the frequency (Doppler frequency) "$f_d$" of the sensor signal always changes according to a moving speed "V" of the detection target object M1 and a horizontal distance "x" from the sensor 10 to the detection target object M1 as explained above. Thus, unlike the noise, the outputted sensor signal is not produced constantly with a particular frequency, when the detection target object M1 is detected. Accordingly, the noise determining unit 15 does not determine that the surrounding environment is in "stable state", when the detection target object M1 is detected. Then, the noise rejection unit 22 can distinguish the sensor signal, outputted upon detection of the detection target object M1, from a noise produced constantly, and can invalidate only a frequency band including the noise.

Then, in the present embodiment, the amplifying circuit 11 divides a frequency band of 0 to 200 [Hz] into a plurality of frequency bands so that each of the plurality of frequency bands is narrower than the bandwidth (40 to 50 [Hz]) of the sensor signal outputted upon detection of the detection target object M1. Therefore, when invalidating a frequency band including a noise of a particular frequency, the object detection device 1 can prevent all signal components from being invalidated and can prevent that sensitivity of detection is decreased, as much as possible.

Incidentally, the determining unit 12 is configured to redefine the threshold value compared with the output of the amplifying circuit 11 when the noise determining unit 15 determines that the surrounding environment is in "stable state". Here, the determining unit 12 stores peak to peak "Vpp" in outputs "V" of each amplifier 18 at the same timing that the noise determining unit 15 stores the intensity data every 1 [s]. Then, the determining unit 15 reads out the maximum "Vpp$_{max}$" of peak to peak "Vpp" stored during the past 10 [s] with respect to each amplifier 18 and redefines a value calculated from Vth=Vavg±Vpp$_{max}$ by using the maximum "Vpp$_{max}$" as new threshold value "Vth", at the same timing that the noise determining unit 15 determines that the surrounding environment is in "stable state". As explained above, the threshold value "Vth" is always updated and then can be defined in stable state according to the surrounding environment where the object detection device 1 is located. Therefore, sensitivity of detection of the detection target object M1 can be improved.

In addition, in the above-mentioned embodiment, a human body is shown as an example of the detection target object M1. However, instead of the human body, the detection target object M1 may be a moving object, such as a vehicle. Then, as long as the sensor 10 is an active sensor, the sensor 10 is not limited to the above-mentioned millimeter-wave sensor and may be a microwave sensor using a microwave or a distance measuring sensor using, for example, an ultrasonic wave as a detection wave and detecting a distance to an object in the detection area A1. Then, even when the sensor 10 is the distance measuring sensor, a frequency of a received ultrasonic wave has some level of bandwidth. Therefore, even if invalidating a frequency band including a noise of a particular frequency, the object detection device 1 can detect the detection target object M1 by using the remaining frequency band.

Although the present invention has been described with reference to certain preferred embodiments, numerous modifications and variations can be made by those skilled in the art without departing from the true spirit and scope of this invention, namely claims.

The invention claimed is:

1. An object detection device comprising:
   an active sensor configured to transmit a detection wave to a predetermined detection area, and to receive the detection wave reflected by a detection target object, and to thereby detect the presence or absence of the detection target object in the predetermined detection area, and to output a sensor signal;
   a signal processor configured to divide the sensor signal outputted from said active sensor to sensor signals with respect to a plurality of frequency bands, and output the divided sensor signals;
   a determining unit configured to determine the presence or absence of the detection target object by comparing the divided sensor signals outputted from said signal processor with a plurality of predetermined threshold values respectively,
   the plurality of predetermined threshold values being defined with respect to the plurality of frequency bands, respectively;
   a frequency analyzer configured to detect a signal intensity of individual frequencies of the sensor signal outputted from said active sensor spaced apart from each other in 1 [Hz] units; and
   a noise rejection unit configured to cause said determining unit to invalidate, from among the plurality of frequency bands, a frequency band including a noise of a particular frequency having a certain signal intensity greater than or equal to a defined value, when the noise of the particular frequency is detected constantly from the signal intensity of the particular frequency outputted from said frequency analyzer.

2. The object detection device as claimed in claim 1, wherein said signal processor comprises an amplifying circuit having a plurality of amplifiers, said plurality of amplifiers being configured to respectively amplify the divided sensor signals with respect to the plurality of frequency bands to output to said determining unit.

3. The object detection device as claimed in claim 1, wherein said active sensor is a Doppler sensor using a radio wave as the detection wave,
   wherein said Doppler sensor is configured to output the sensor signal having a frequency which is equivalent to a frequency difference between the detection wave transmitted to the detection area and the detection wave reflected by the detection target object moving in the detection area.

4. The object detection device as claimed in claim 3, wherein the sensor signal outputted from said active sensor includes a predetermined frequency band which depends at least on a size of the detection target object and which has a width greater than or equal to a predetermined width, when said active sensor detects the presence of the detection target object,
   wherein a band width of each of the plurality of frequency bands for the divided sensor signals outputted from said signal processor is defined to be narrower than a band width of the predetermined frequency band.

5. The object detection device as claimed in claim 1 wherein said determining unit is configured to redefine the plurality of predetermined threshold values according to the surrounding environment in stable state, where a variation width of the signal intensity of the sensor signal detected by said frequency analyzer is within a defined range during a predetermined time period.

6. An illumination system comprising:
   the object detection device as claimed in claim 1; and
   a lighting apparatus connected to the object detection device,
   wherein the object detection device comprises a lighting controller, said lighting controller controlling a lighting state of said lighting apparatus to activate said lighting apparatus, when detecting the presence of the detection target object.

7. An illumination system comprising:
   the object detection device as claimed in claim 2; and
   a lighting apparatus connected to the object detection device,
   wherein the object detection device comprises a lighting controller, said lighting controller controlling a lighting state of said lighting apparatus to activate said lighting apparatus, when detecting the presence of the detection target object.

8. An illumination system comprising:
   the object detection device as claimed in claim 3; and
   a lighting apparatus connected to the object detection device,
   wherein the object detection device comprises a lighting controller, said lighting controller controlling a lighting state of said lighting apparatus to activate said lighting apparatus, when detecting the presence of the detection target object.

9. An illumination system comprising:
   the object detection device as claimed in claim 4; and
   a lighting apparatus connected to the object detection device, wherein the object detection device comprises a lighting controller, said lighting controller controlling a lighting state of said lighting apparatus to activate said lighting apparatus, when detecting the presence of the detection target object.

10. An illumination system comprising:

the object detection device as claimed in claim 5; and a lighting apparatus connected to the object detection device, wherein the object detection device comprises a lighting controller, said lighting controller controlling a lighting state of said lighting apparatus to activate said lighting apparatus, when detecting the presence of the detection target object.

* * * * *